US008490051B2

(12) United States Patent
Andersen et al.

(10) Patent No.: US 8,490,051 B2
(45) Date of Patent: Jul. 16, 2013

(54) GENERIC INTERFACE FOR NUMERIC TYPES

(75) Inventors: Melitta Andersen, Omaha, NE (US);
James S. Miller, Bellevue, WA (US);
Anthony J. Moore, Seattle, WA (US);
Ariel Weinstein, Elmont, NY (US); Josh Free, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1390 days.

(21) Appl. No.: 11/712,000

(22) Filed: Feb. 28, 2007

(65) Prior Publication Data

US 2008/0209394 A1  Aug. 28, 2008

(51) Int. Cl.
*G06F 9/44* (2006.01)
*G06F 13/00* (2006.01)

(52) U.S. Cl.
USPC ............ 717/116; 717/108; 719/331; 719/332

(58) Field of Classification Search
USPC ................. 717/108, 114–119, 141–143, 146; 719/331–332
See application file for complete search history.

(56) References Cited

U.S. PATENT DOCUMENTS

| 5,659,753 | A | | 8/1997 | Murphy et al. |
| 5,696,974 | A | * | 12/1997 | Agrawal et al. ............... 717/152 |
| 5,708,828 | A | | 1/1998 | Coleman |
| 5,821,934 | A | * | 10/1998 | Kodosky et al. .............. 715/763 |
| 6,738,968 | B1 | | 5/2004 | Bosworth et al. |
| 6,782,532 | B1 | | 8/2004 | Sexton et al. |
| 6,941,556 | B1 | | 9/2005 | Kessler et al. |
| 7,039,900 | B2 | * | 5/2006 | Lecerf ........................... 717/116 |
| 7,076,785 | B2 | | 7/2006 | Mishra et al. |
| 7,086,041 | B2 | | 8/2006 | Plesko et al. |
| 7,735,061 | B2 | * | 6/2010 | Sweeney ....................... 717/114 |
| 2003/0033162 | A1 | * | 2/2003 | Houssiaux et al. ............... 705/1 |
| 2003/0069969 | A1 | | 4/2003 | Renaud |
| 2004/0187100 | A1 | | 9/2004 | Thiruvillamalai |
| 2004/0255267 | A1 | | 12/2004 | Meijer |
| 2005/0055681 | A1 | | 3/2005 | Gadre |
| 2005/0055682 | A1 | * | 3/2005 | Gadre et al. .................. 717/146 |

OTHER PUBLICATIONS

Allen et al., "A First-Class Approach to Genericity", Oct. 2003, ACM, 19pg.*
Pozo, Roldan, "Template Numerical Toolkit for Linear Algebra: High Performance Programming with C++ and the Standard Template Library", 1997, Sage Publications, 12pg.*
Shemitz, Jon, ".NET 2.0 for Delphi Programmers", 2006, Apress, pp. 107-124.*

(Continued)

*Primary Examiner* — Li B Zhen
*Assistant Examiner* — Ryan Coyer

(57) ABSTRACT

Various technologies and techniques are disclosed for providing a common generic interface for numeric types in statically typed languages. The common generic interface defines basic arithmetic operations, thereby allowing basic arithmetic operations to be performed on the numeric types. The common generic interface provides support for overflow detection when a result of an operation being performed on a particular numeric type will result in an overflow situation when the operation does not fit within a range supported by the particular numeric types. The common generic interface provides support for one or more mathematical properties to be retrieved for a particular one of the numeric types being used in a particular circumstance.

20 Claims, 9 Drawing Sheets

OTHER PUBLICATIONS

Naugler, David, "Generics, Delegates and Functional Programming in C# 2.0," 2006, Consortium of Computing Sciences in Colleges, 7pg.*

Järvi et al., "Algorithm Specialization in Generic Programming," ACM, 2006, 11pg.*

Siek et al., "Essential Language Support for Generic Programming," ACM, 2005, 12pg.*

Sridranop et al., "Adding Polymorphic Tuples and Lists to the Syntax of Java," ACM, 2004, 6pg.*

Gibbons, Jeremy, "Datatype—Generic Programming," Springer-Verlag, 2007, 71pg.*

"Generic Types", http://webcem01.cem.itesm.mx:8005/web/java/tutorial/java/generics/gentypes.html.

Prossliner Guenter, "DuckTyping: Runtime Dynamic Interface Implementation", http://www.codeproject.com/cs/library/nduck.asp?df=100&forumid=351497&exp=0&select=1756052.

Siek, et al., "Generic Programming for High Performance Numerical Linear Algebra", http://osl.iu.edu/download/research/mtl/papers/mtl_siam_final.ps.gz.

* cited by examiner

```
public static void Main(){
    List<Byte> sequence = new List<Byte>();
    sequence.Add(10);
    sequence.Add(20);
    sequence.Add(30);
    Console.WriteLine("the mean is: " + Mean(sequence));
}

//
// calculates the mean value of the sequence
//
public static T Mean<T>(IEnumerable<T> sequence) where T : IArithmetic<T>{
    T sum = Arithmetic.GetZero<T>;
    T count = Arithmetic.GetZero<T>;
    T one = Arithmetic.GetOne<T>;

foreach(T item in sequence){
        sum   = Arithmetic.Add<T>(sum, item);
        count = Arithmetic.Add<T>(count, one);
    }
    return Arithmetic.Divide<T>(sum, count);
}
```

GENERIC INTERFACE FOR NUMERIC TYPES

BACKGROUND

In the world of computer software, programming languages are either dynamically typed or statically typed. In dynamically typed languages, a variable can be used without specifying what data type it represents (i.e. without declaring a data type). At runtime, the system determines what data type the variable represents, and treats it accordingly. Python, PHP, and VB Script are examples of dynamically typed languages. In statically typed languages, variables must be declared before they are used. For example, if you want to use a variable called Counter to track the number of times a certain program has executed, you would have to declare the Counter variable as a particular numeric type, such as an integer, before using the variable in an operation. With statically typed languages, the data type of each variable is known at compile time. Some examples of statically typed languages are Java, C++, and C.

One common problem is the difficulty in writing code that could target multiple different numeric types rather than being specific to just one. For example, you might want to write a routine that adds the elements of an array of numeric types. Conventional techniques require duplicating code for each type supported. Generics allow a single API signature to potentially work on a number of types, but without an interface to allow the arithmetic operations, it is not possible to do the summation.

The advantage of a generic interface over a non-generic one is that it allows routines or classes that use the interface to be strongly typed, so that for example, if the result of a generic math algorithm is assigned to the wrong data type, an error is generated at compile time. Statically typed languages treat each numeric type as very different entities, thereby making even basic math among numeric types sometimes difficult.

SUMMARY

Various technologies and techniques are disclosed for providing a common generic interface for numeric types in statically typed programming languages. The common generic interface defines basic arithmetic operations, thereby allowing basic arithmetic operations to be performed on the numeric types. The common generic interface provides support for overflow detection when a result of an operation being performed on a particular numeric type will result in an overflow situation when the operation does not fit within a range supported by the particular numeric types. In one implementation, information obtained during the overflow detection is used to determine an appropriate next action. The common generic interface provides support for one or more mathematical properties to be retrieved for a particular one of the numeric types being used in a particular circumstance.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 9 shows some exemplary source code of one implementation that illustrates using a common generic interface to perform basic arithmetic operations.

DETAILED DESCRIPTION

Figure 1:
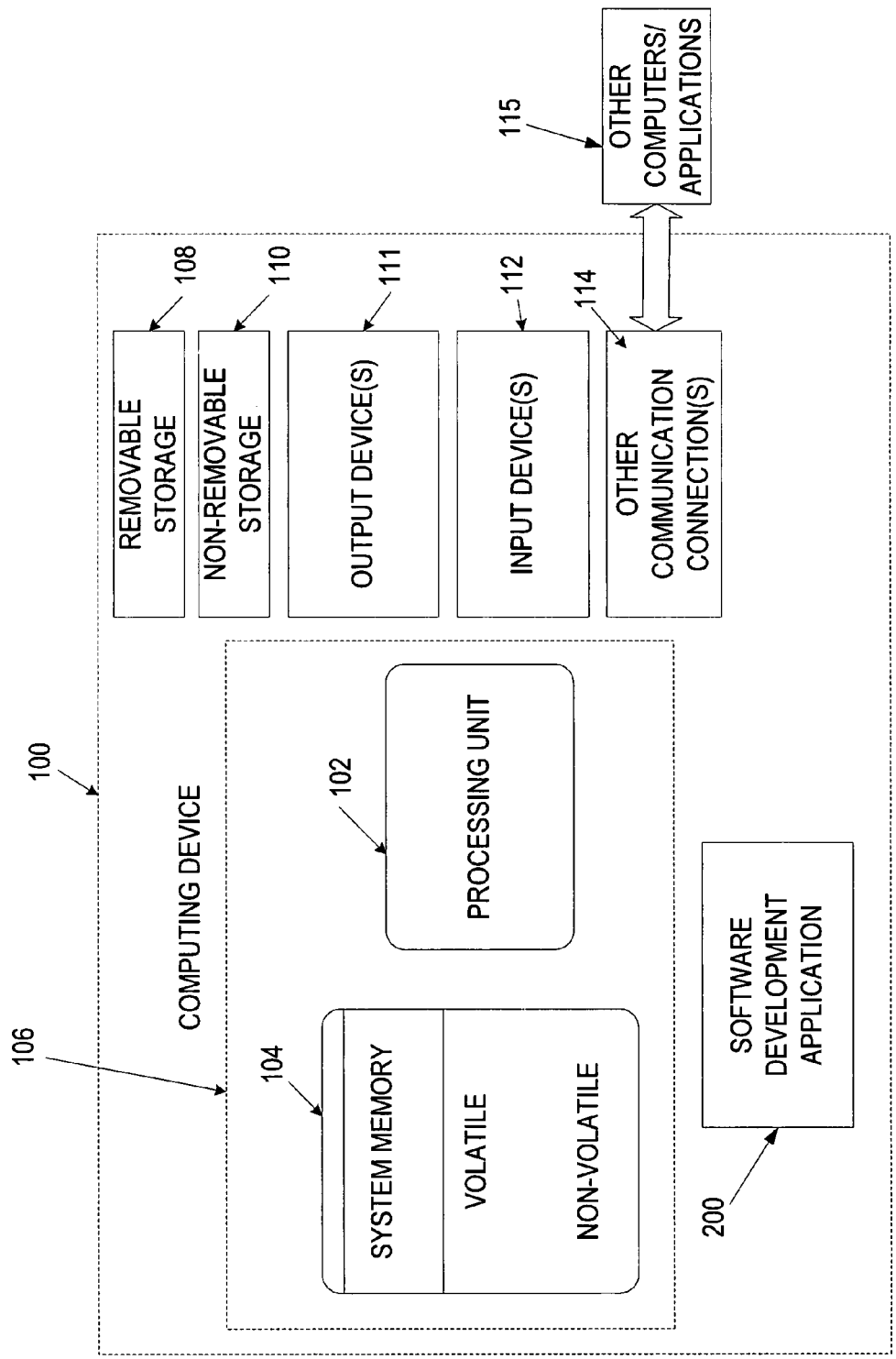
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a software development language, but the system also serves other purposes in addition to these. In one implementation, one or more of the techniques described herein can be implemented as features within one or more languages contained in a software development program such as MICROSOFT® VISUAL STUDIO®, or from any other type of program or service that allows for development of software.

In one implementation, the system provides a common generic interface for numeric types in statically typed languages. This common generic interface allows basic mathematical operations to be performed between various numeric types. By implementing the common generic interface, overflow situations can also be detected, and various mathematical properties regarding the numeric types can also retrieved.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes software development application 200. Software development application 200 will be described in further detail in FIG. 2.

Figure 2:
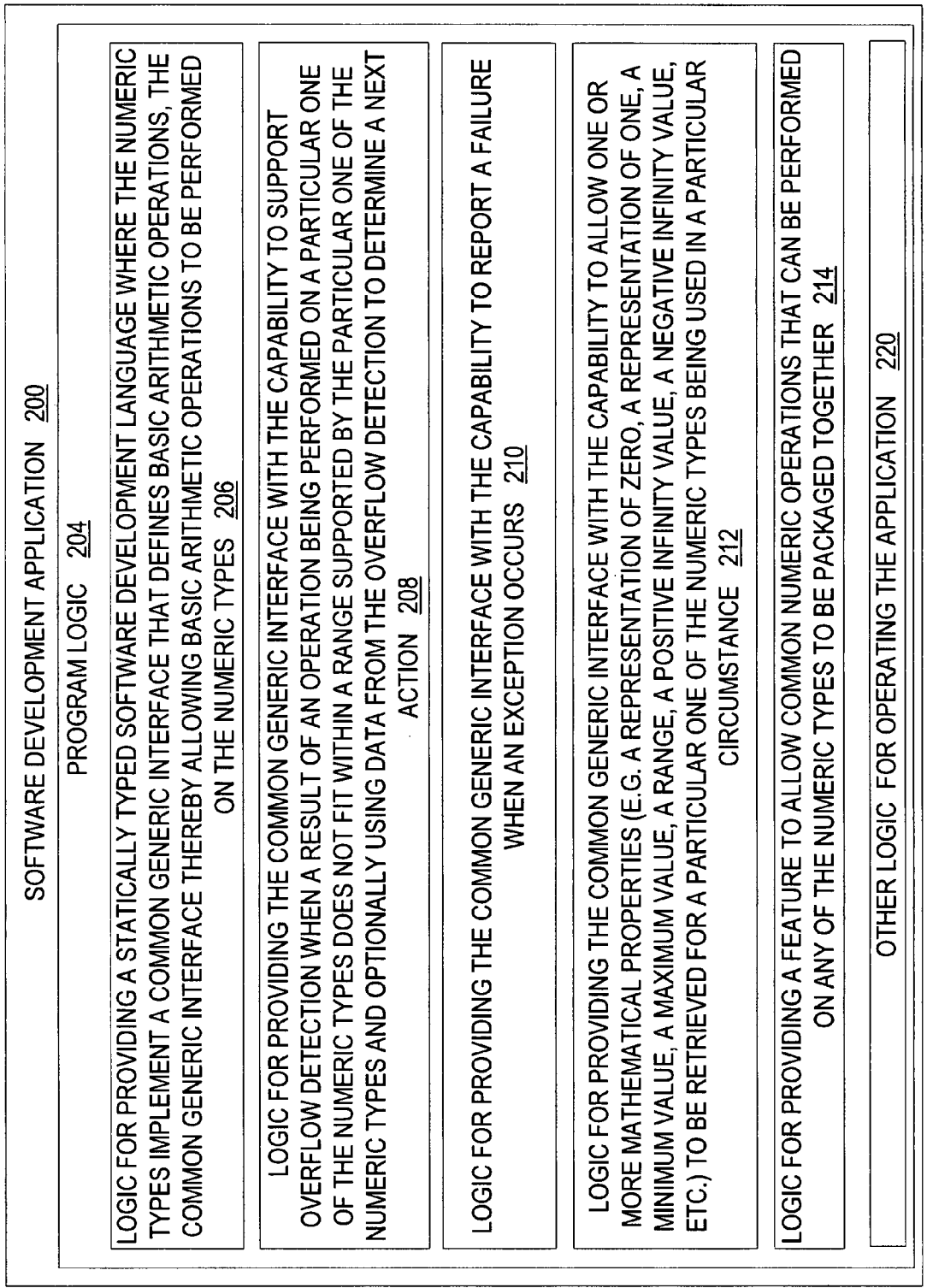
FIG. 2 is a diagrammatic view of a software development application of one implementation operating on the computer system of FIG. 1.

Turning now to FIG. 2 with continued reference to FIG. 1, a software development application 200 operating on computing device 100 is illustrated. Software development application 200 is one of the application programs that reside on computing device 100. However, it will be understood that software development application 200 can alternatively or additionally be embodied as computer-executable instructions on one or more computers and/or in different variations than shown on FIG. 1. Alternatively or additionally, one or more parts of software development application 200 can be part of system memory 104, on other computers and/or applications 115, or other such variations as would occur to one in the computer software art.

Software development application 200 includes program logic 204, which is responsible for carrying out some or all of the techniques described herein. Program logic 204 includes logic for providing a statically typed software development language where the numeric types implement a common generic interface that defines basic arithmetic operations, the common generic interface thereby allowing basic arithmetic operations to be performed on the numeric types 206; logic for providing the common generic interface with the capability to support overflow detection when a result of an operation being performed on a particular one of the numeric types does not fit within a range supported by the particular one of the numeric types and optionally using data from the overflow detection to determine a next action 208; logic for providing the common generic interface with the capability to report a failure when an exception occurs 210; logic for providing the common generic interface with the capability to allow one or more mathematical properties (e.g. a representation of zero, a representation of one, a minimum value, a maximum value, a range, a positive infinity value, a negative infinity value, etc.) to be retrieved for a particular one of the numeric types being used in a particular circumstance 212; logic for providing a feature to allow common numeric operations that can be performed on any of the numeric types that implement the common generic interface to be packaged together, either with the interface or independently 214; and other logic for operating application 220. In one implementation, program logic 204 is operable to be called programmatically from another program, such as using a single call to a procedure in program logic 204.

Figure 3:
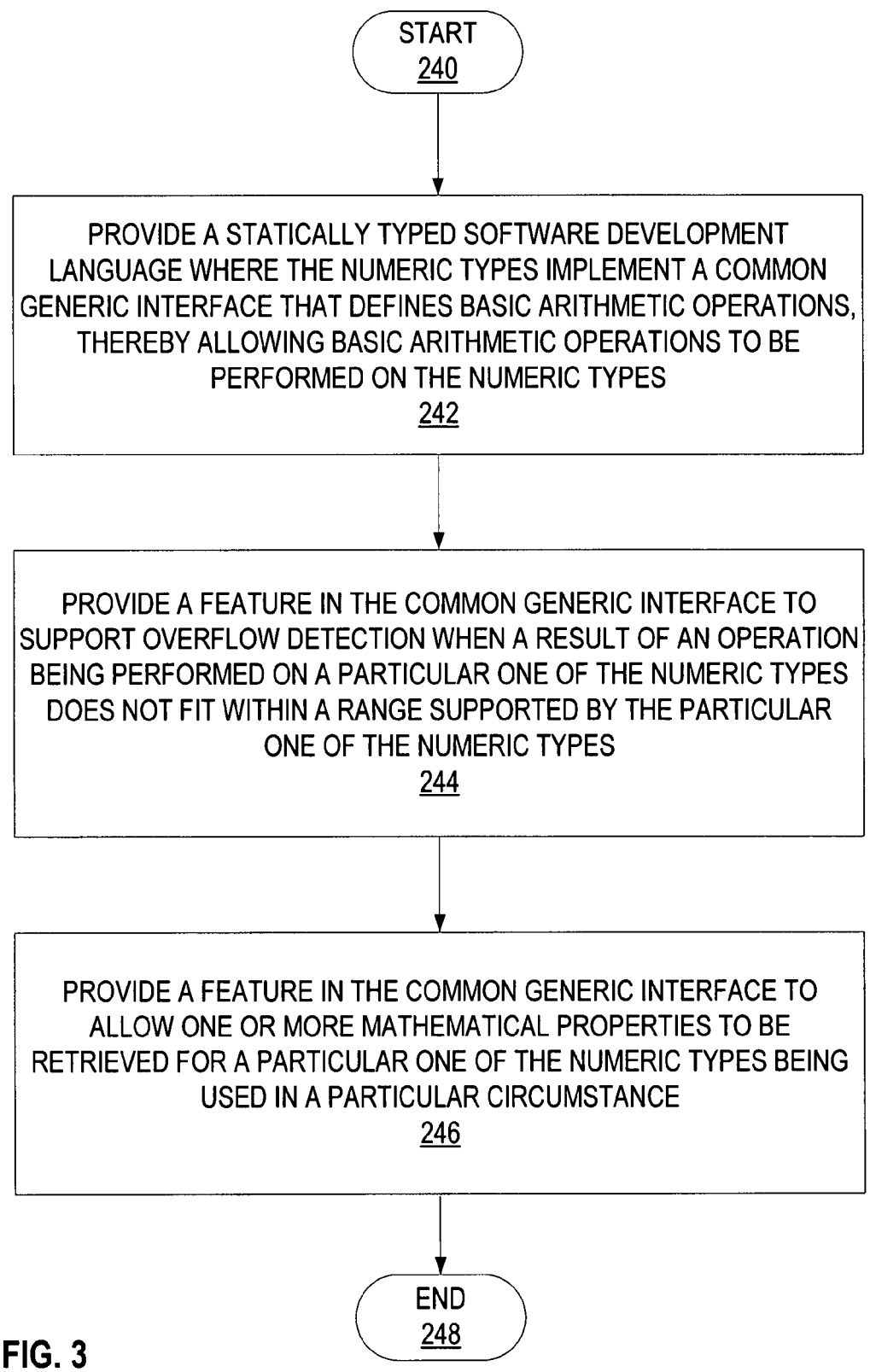
FIG. 3 is a high-level process flow diagram for one implementation of the system of FIG. 1.

Turning now to FIGS. 3-6 with continued reference to FIGS. 1-2, the stages for implementing one or more implementations of software development application 200 are described in further detail. FIG. 3 is a high level process flow diagram for software development application 200. In one form, the process of FIG. 3 is at least partially implemented in the operating logic of computing device 100. The process begins at start point 240 with providing a statically typed software development language where the numeric types implement a common generic interface that defines basic arithmetic operations, thereby allowing basic arithmetic operations to be performed on the numeric types (stage 242). A feature is provided in the common generic interface to support overflow detection when a result of an operation being performed on a particular one of the numeric types does not fit within a range supported by the particular one of the numeric types (stage 244). A feature is provided in the common generic interface to allow one or more mathematical properties to be retrieved for a particular one of the numeric types being used in a particular circumstance (stage 246). The process ends at end point 248.

Figure 4:
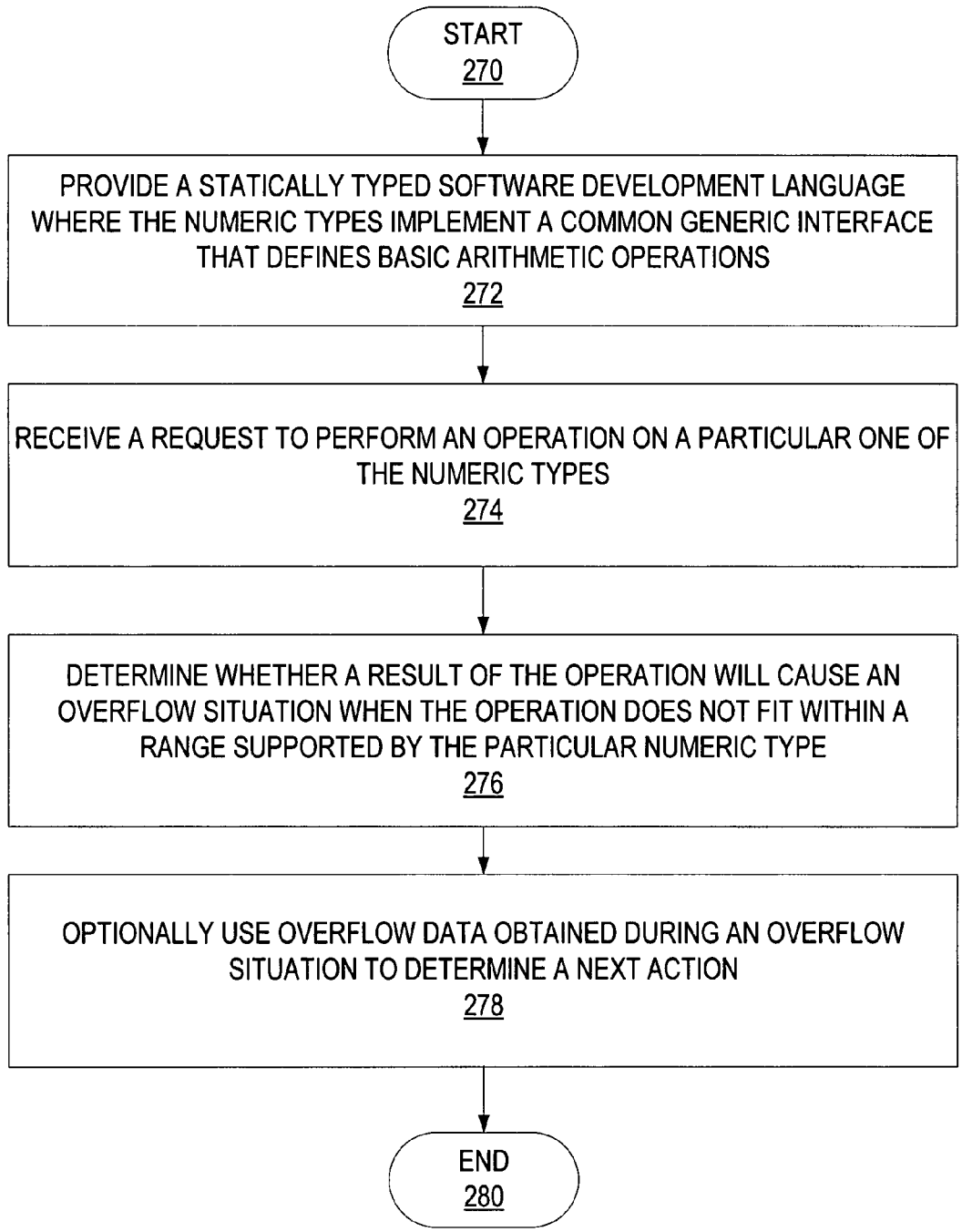
FIG. 4 illustrates one implementation of the stages involved in providing a common generic interface for numeric types that has an overflow detection capability.

FIG. 4 illustrates one implementation of the stages involved in providing a common generic interface for numeric types that has an overflow detection capability. In one form, the process of FIG. 4 is at least partially implemented in the operating logic of computing device 100. The process begins at start point 270 with providing a statically typed software development language where the numeric types implement a common generic interface that defines basic arithmetic operations (stage 272). A request is received to perform an operation on a particular one of the numeric types (stage 274). The system determines whether a result of the operation will cause an overflow situation when the operation does not fit within a range supported by the particular numeric type (stage 276). Overflow data obtained during an overflow situation can optionally be used to determine a next action (stage 278). The process ends at end point 280.

Figure 5:
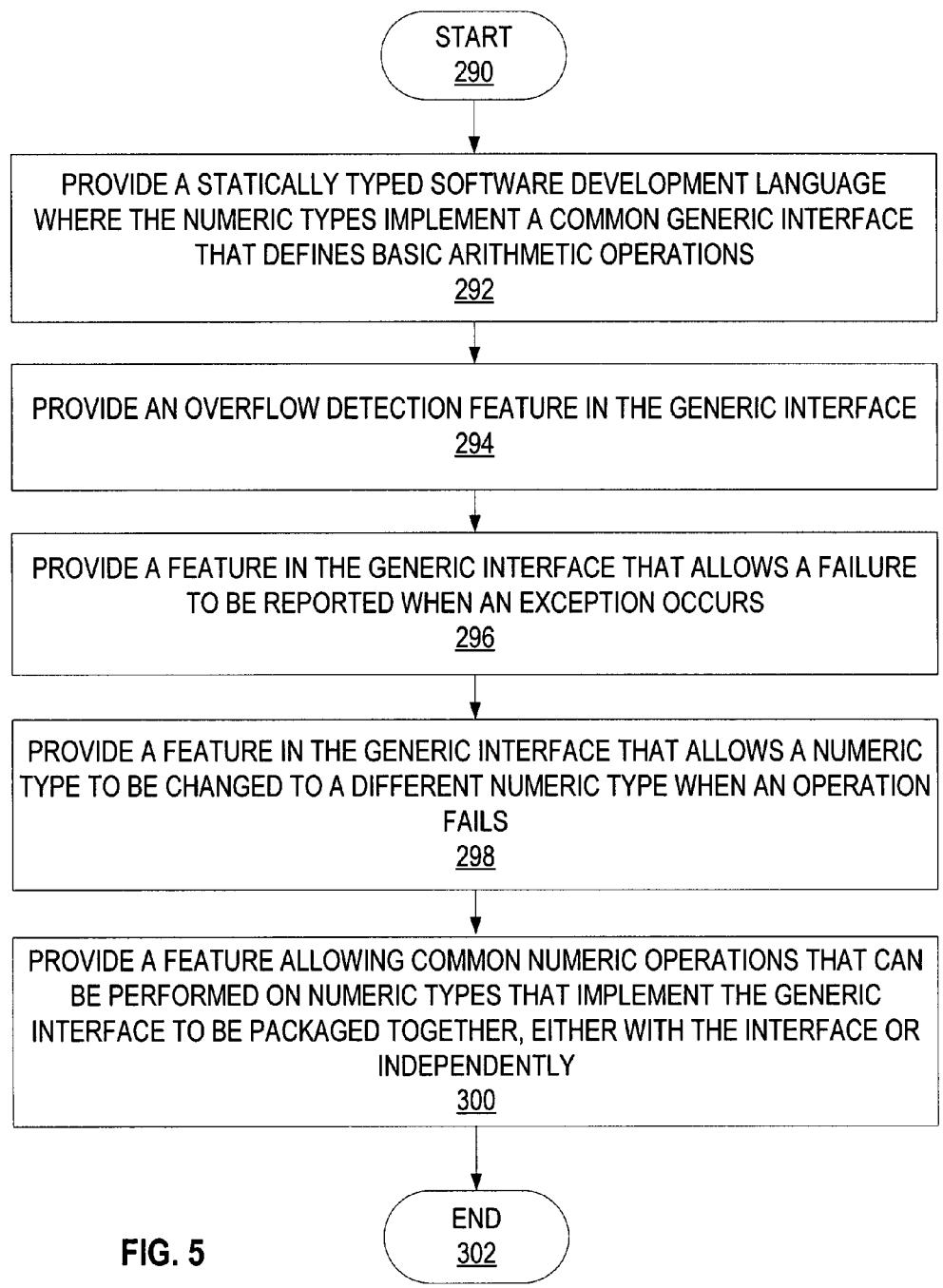
FIG. 5 illustrates one implementation of the stages involved in providing a common generic interface with various features for numeric types.

FIG. 5 illustrates one implementation of the stages involved in providing a common generic interface with various features for numeric types. In one form, the process of FIG. 5 is at least partially implemented in the operating logic of computing device 100. While the stages in FIG. 5 are explained in a certain order, it will be appreciated that no particular order is intended. Some, all, fewer, and/or additional stages could be performed in one of various orders in other implementations. The process begins at start point 290 with providing a statically typed software development language where the numeric types implement a common generic interface that defines basic arithmetic operations (stage 292). An overflow detection feature is provided in the generic interface (stage 294). A feature is provided in the generic interface that allows a failure to be reported when an exception occurs (stage 296). A feature in the generic interface is provided that allows a numeric type to be changed to a different numeric type when an operation fails (stage 298). A feature is provided that allows common numeric operations that can be performed on any of the numeric types that implement the common interface to be packaged together, either with the interface or independently (stage 300). The process ends at end point 302.

Figure 6:
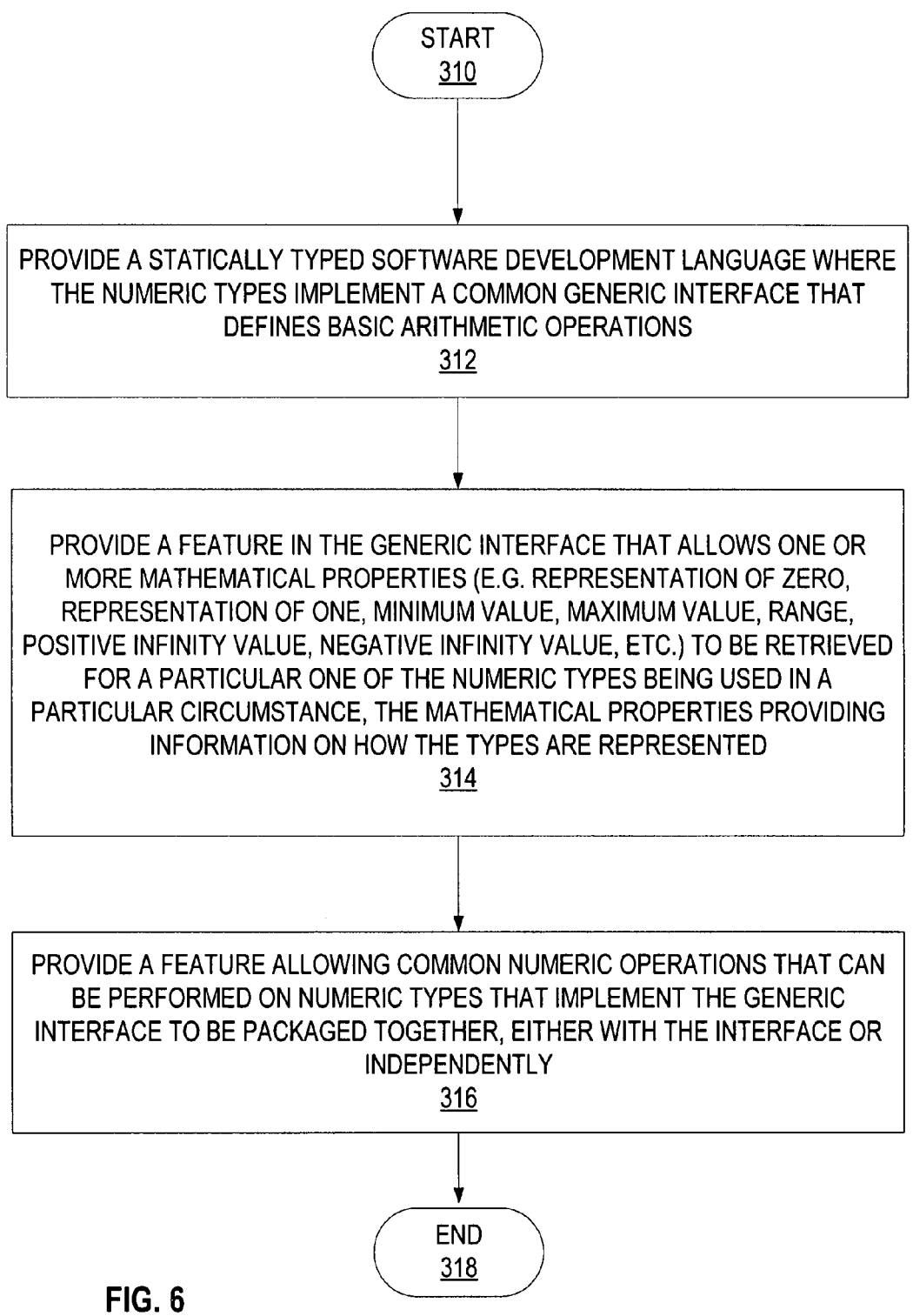
FIG. 6 illustrates one implementation of the stages involved in providing support for various mathematical properties for numeric types implementing a common generic interface.

FIG. 6 illustrates one implementation of the stages involved in providing support for various mathematical properties for numeric types implementing a common generic interface. In one form, the process of FIG. 6 is at least partially implemented in the operating logic of computing device 100. The process begins at start point 310 with providing a statically typed software development language where the numeric types implement a common generic interface that defines basic arithmetic operations (stage 312). A feature is provided in the generic interface that allows one or more mathematical properties (e.g. representation of zero, representation of one, minimum value, maximum value, range, positive infinity value, negative infinity value, etc.) to be retrieved for a particular one of the numeric types being used in a particular circumstance, the mathematical properties providing information on how the types are represented (stage 314). A feature is provided to allow any of the types that implement the common generic interface to be packaged together, either with the interface or independently (stage 316). The process ends at end point 318.

Figure 7:
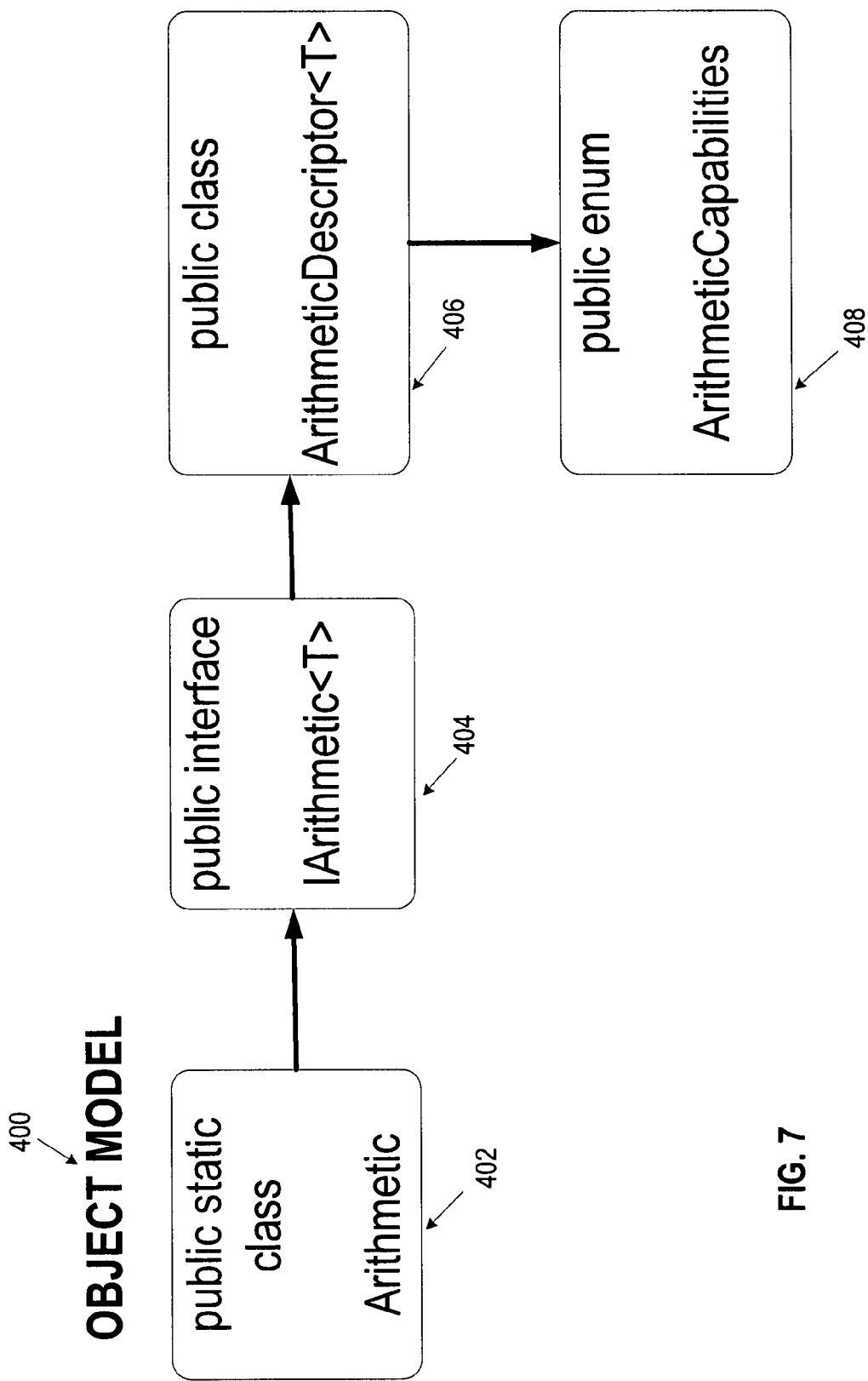
FIG. 7 is an exemplary object model for an Arithmetic class of one implementation of the system of FIG. 1.

FIG. 7 is an exemplary object model 400 for an Arithmetic class of one implementation of the system of FIG. 1. The names shown in object model 400 are exemplary in nature, and various other names could be used in alternate implementations. The public Arithmetic class 402 is a static class that will be consumed by end users. The IArithmetic<T> public interface 404 is a common generic interface that defines the basic arithmetic operations. In one implementation, all numeric types in the software development language implement this interface on their numeric struct or class. By implementing this common generic interface, basic arithmetic operations can be performed on the numeric types. The ArithmeticDescriptor<T> abstract class 406 describes the numeric properties of the type T, such as its Additive and Multiplicative identities. The ArithmeticCapabilities enumeration 408 is used by the ArithmeticDescriptor<T> 406, and includes various mathematical properties that can be retrieved for each of the numeric types implementing the IArithmetic<T> interface 404. A few non-limiting examples of these mathematical properties include, but are not limited to the particular type's representation of zero, representation of one, minimum value, maximum value, range, support for positive infinity, support for negative infinity, etc. Some, all, and/or additional mathematical properties can be supported in alternate implementations.

Figure 8:
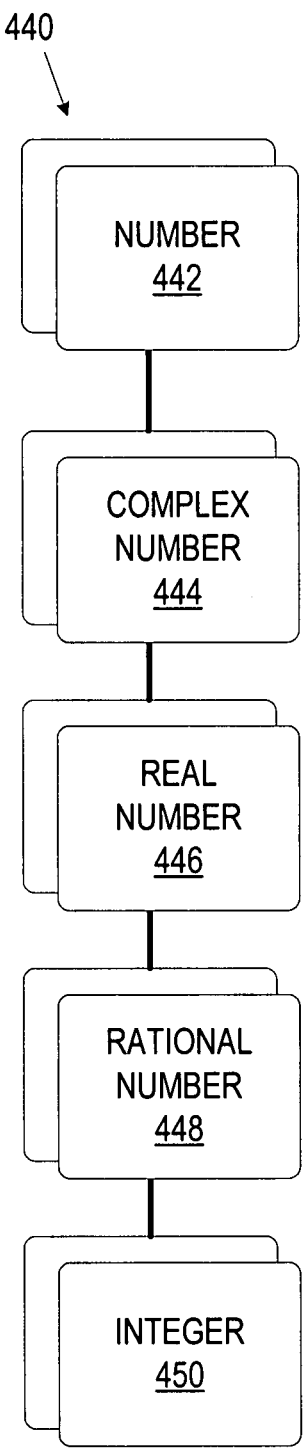
FIG. 8 illustrates a diagram showing exemplary classes that may implement a common generic interface and related public class.

FIG. 8 illustrates a diagram showing exemplary numeric types 440 of one implementation that may implement the common generic interface and related public class. Number 442, complex number 444, real number 446, rational number 448, and integer 450 are all non-limiting examples of the types of numeric types that may implement the common generic interface discussed herein.

FIG. 9 shows some exemplary source code 460 of one implementation that illustrates using a common generic interface (called IArithmetic<T> in the example shown) to perform basic arithmetic operations on generic types, such as add, subtract, multiply, and divide. The example demonstrates the ability to perform these basic operations on generic types using a "Mean" method that calculates a mean value of a particular sequence and returns it to the calling function. In the example shown, the various arithmetic operations are performed without requiring the variables to be converted from one type to another.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer-readable storage device, comprising:
  a software development application for providing a statically typed software development language that implements a public arithmetic class having an object model that includes:
  a public generic interface that defines basic arithmetic operations, the public generic interface being implementable by a plurality of numeric types, thereby allowing basic arithmetic operations to be performed on the plurality of numeric types, the public generic interface being operable to change to a second one of the numeric types in response to a determination that a result of an operation being performed on a first one of the numeric types would not fit within a range supported by the first one of the numeric types;
  a public arithmetic descriptor class that describes numeric properties of each of the plurality of numeric types implementing the public generic interface; and
  an arithmetic capabilities enumeration used by the public arithmetic descriptor class that includes mathematical properties that can be retrieved for each of the plurality of numeric types implementing the public generic interface.

2. The computer-readable storage device of claim 1, wherein the public generic interface is operable to use overflow data obtained during overflow detection to determine a next action.

3. The computer-readable storage device of claim 1, wherein the public generic interface is operable to report a failure when an exception occurs.

4. The computer-readable storage device of claim 1, wherein the public generic interface is operable to change to a second one of the numeric types when a first attempt to perform an operation with a first one of the numeric types fails.

5. The computer-readable storage device of claim 1, wherein the public arithmetic descriptor class is operable to allow one or more mathematical properties to be retrieved for a particular one of the numeric types being used in a particular circumstance.

6. The computer-readable storage device of claim 5, wherein the mathematical properties that can be retrieved are selected from the group consisting of a representation of zero, a representation of one, a minimum value, a maximum value, a range, a positive infinity value, and a negative infinity value.

7. The computer-readable storage device of claim 1, wherein support is provided to allow common numeric operations that can be performed on any of the numeric types to be packaged together.

8. A computer-implemented method for providing a common generic interface with overflow detection comprising the steps of:
  providing a statically typed software development language that implements, in the logic of a computing device, a public arithmetic class having an object model that includes a public generic interface that defines basic arithmetic operations and that allows basic arithmetic operations to be performed on a plurality of numeric types, the public generic interface being implementable by the plurality of numeric types, a public arithmetic descriptor class that describes the numeric properties of each of the plurality of numeric types implementing the public generic interface, and an arithmetic capabilities enumeration used by the public arithmetic descriptor class that includes mathematical properties that can be retrieved for each of the plurality of numeric types implementing the public generic interface;

receiving a request to perform an operation on a particular one of the numeric types;

determining whether a result of the operation will create an overflow situation when the operation does not fit within a range supported by the particular one of the numeric types; and changing, using the public generic interface, to a second one of the numeric types if the result of the operation does not fit within the range supported by the particular one of the numeric types.

9. The method of claim 8, wherein the public generic interface allows basic arithmetic operations to be performed on the numeric types.

10. The method of claim 8, wherein the public generic interface is operable to report a failure when an exception occurs.

11. The method of claim 8, wherein the public generic interface is operable to change to a second one of the numeric types when a first attempt to perform an operation with a first one of the numeric types fails.

12. The method of claim 8, wherein support is provided to allow common numeric operations that can be performed on any of the numeric types to be packaged together.

13. A computer-readable storage device having computer-executable instructions recorded thereon for causing a computer to perform the steps recited in claim 8.

14. A computer-implemented method for providing a common generic interface that supports various mathematical properties comprising the steps of:

providing a statically typed software development language that implements, in the logic of a computing device, a public arithmetic class having an object model that includes a public generic interface that defines basic arithmetic operations, thereby allowing basic arithmetic operations to be performed on a plurality of numeric types, the public generic interface being implementable by the plurality of numeric types, a public arithmetic descriptor class that describes the numeric properties of each of the plurality of numeric types implementing the public generic interface, and an arithmetic capabilities enumeration used by the public arithmetic descriptor class;

changing, using the public generic interface, to a second one of the numeric types in response to a determination that a result of an operation being performed on a first one of the numeric types would not fit within a range supported by the first one of the numeric types; and retrieving, using the arithmetic capabilities enumeration, one or more mathematical properties for a particular one of the numeric types being used in a particular circumstance.

15. The method of claim 14, wherein the mathematical properties that can be retrieved are selected from the group consisting of a representation of zero, a representation of one, a minimum value, a maximum value, a range, a positive infinity value, and a negative infinity value.

16. The method of claim 14, wherein one or more of the mathematical properties provide information about how a particular one of the numeric types are represented.

17. The method of claim 14, wherein support is provided to allow common numeric operations that can be performed on any of the numeric types to be packaged together.

18. A computer-readable storage device having computer-executable instructions recorded thereon for causing a computer to perform the steps recited in claim 14.

19. The method of claim 8, wherein the public arithmetic descriptor class is operable to allow one or more mathematical properties to be retrieved for a particular one of the numeric types being used in a particular circumstance.

20. The method of claim 19, wherein the mathematical properties that can be retrieved are selected from the group consisting of a representation of zero, a representation of one, a minimum value, a maximum value, a range, a positive infinity value, and a negative infinity value.

* * * * *